Patented Apr. 24, 1945

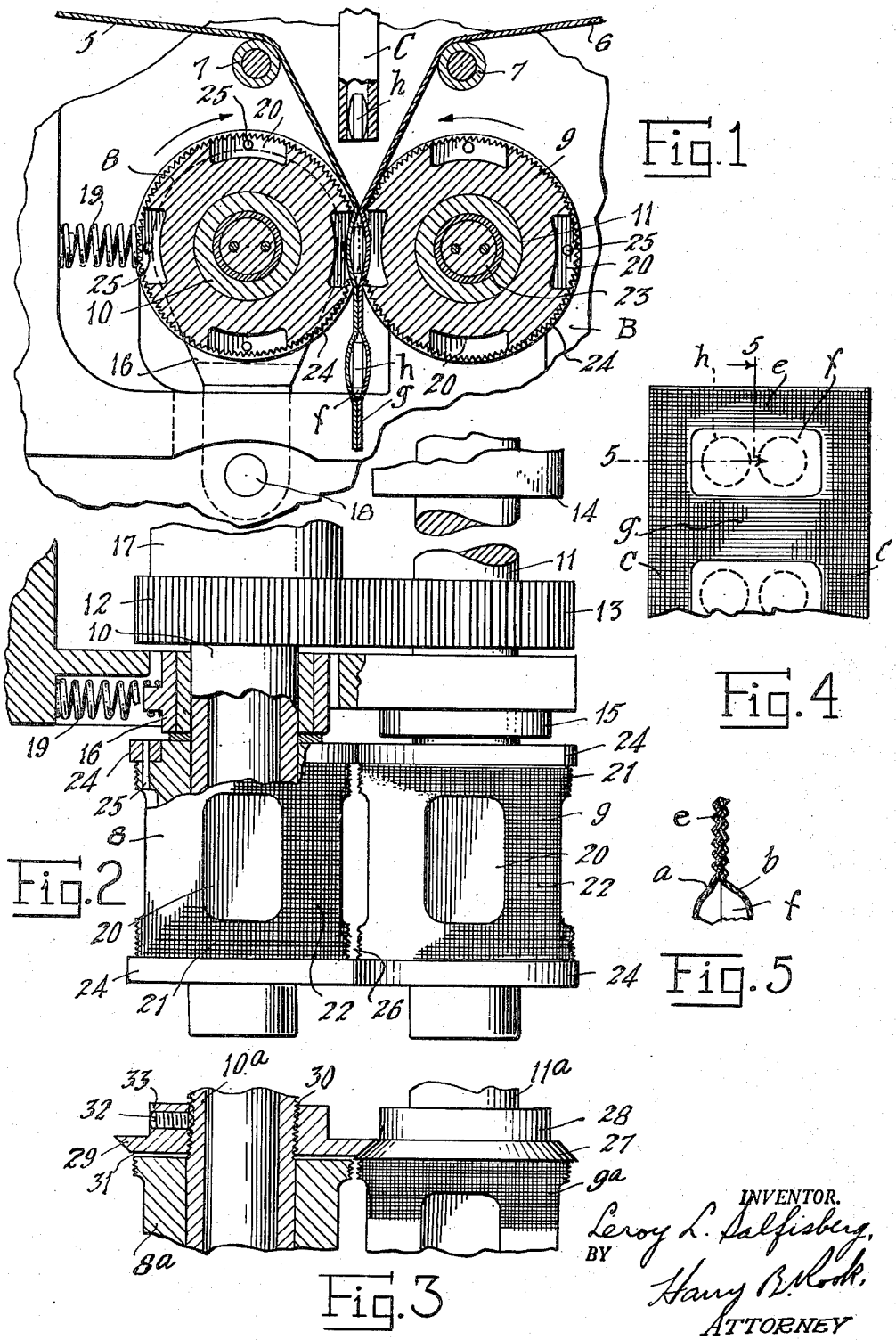

2,374,504

UNITED STATES PATENT OFFICE 2,374,504

SEALING AND CRIMPING ROLLERS FOR PACKAGING MACHINES

Leroy L. Salfisberg, South Orange, N. J., assignor to Ivers-Lee Company, Newark, N. J., a corporation of Delaware Application October 31, 1944, Serial No. 561,219

6 Claims. (Cl. 93—3)

This invention relates in general to packaging machines of the type which includes rollers that are adapted to receive and seal and crimp between them two or more opposed layers or strips of flexible packaging material so as to form commodity-containing envelopes or bags in a continuous operation. A machine of this general character is described in my United States Patent No. 2,083,617 dated June 15, 1937.

The present invention has particular reference to improvements in such rollers especially, although not exclusively, intended for use in making packages formed of thin sheet material such as "Cellophane" and "Pliofilm" and particularly sheet material which is itself thermoplastic and can be softened by heat or which has a thermoplastic fusible or adhesive coating such that the layers can be caused to adhere together by application of heat and pressure or pressure alone to form a seal.

It is important, especially where the areas to be sealed and crimped or corrugated are large, that the surfaces of the rollers shall be in exact parallelism at the zone of contact thereof with the packaging material to ensure uniform pressure upon and sealing of the layers of packaging material throughout said zone of contact.

One object therefore of my invention is to provide a novel and improved construction and combination of rollers of the general character described and mounting and driving means therefor, such that the peripheral surfaces of said rollers shall always be exactly parallel to each other in their common axial plane which passes through the zone of contact of the rollers with the packaging material.

In such machines it is important that enough pressure is exerted by the rolls on the packaging material to form the right depth of penetration of the crimps, corrugations, pyramidal projections, or recesses. It is also important that too much pressure is not exerted on the material otherwise the material will become perforated or otherwise damaged.

It is therefore another object of the present invention to provide the rollers with means for holding the rollers in accurately spaced relation.

It is a further object to provide such rollers with adjustable means for holding them in properly spaced relation.

Other objects, advantages and results will be brought out by the following description in conjunction with the accompanying drawing in which—

Figure 1 is a fragmentary front elevational view partially in section of one form of sealing and crimping mechanism for packaging apparatus embodying my invention.

Figure 2 is a top plan view of the mechanism with portions broken away and shown in horizontal section.

Figure 3 is a top plan view of a modified form of my invention, parts being shown in section.

Figure 4 is a front view of a portion of one type of package for the manufacture of which the sealing and crimping mechanism may be utilized, and Figure 5 is an enlarged fragmentary vertical sectional view taken through the upper part of the package of Figure 4.

Referring particularly to Figures 1 and 2 of the drawing, the reference characters 5 and 6 designate two layers or strips of packaging material, for example, "Pliofilm," "Cellophane," metal foil, paper or the like, but preferably thermoplastic material or material having a thermoplastic coating on one side thereof so that the two layers can be secured together under simultaneous application of heat and pressure. These strips are led from a suitable source of supply over guide rollers 7 to a sealing and crimping mechanism which includes rollers 8 and 9 that receive the layers between them.

Each roller 8 and 9 frictionally contacts with one of the layers 5 and 6 so as to press said layer into contact with the other layer, the rollers being mounted to rotate on approximately parallel axes by the respective shafts 10 and 11 which are geared together by spur gears 12 and 13 so that the rollers will rotate in opposite directions. One of the shafts, in the present instance the shaft 11, is driven from any suitable source of power. The shafts may be mounted in any suitable manner but as shown the shaft 11 is journaled in bearings 14 and 15 which may form a part of the main frame of the packaging machine, while the shaft 10 is journaled in two bearings 16 and 17 that preferably are connected integrally and pivotally mounted at 18 on the frame B of the machine so that the roller 8 may move toward and from the roller 9. Preferably a compression spring 19 is interposed between one of the bearings, specifically the bearing 16, and the frame B of the machine so as to normally influence the rollers into peripheral contact with each other.

The rollers as shown are specifically designed to manufacture a package like that shown in Figures 4 and 5, which comprises two pieces $a$ and $b$ of packaging material sealed together along their longitudinal edges at $c$ and across transverse edge e to form article-receiving compartments f in which articles, such as tablets h, may be packaged. The compartment f is sealed along the opposite transverse edge g of the layers a and b.

The rollers 8 and 9 have complemental registering recesses 20 to provide clearance spaces between them for the articles h that are disposed between the layers of packaging material, the shape of the recesses corresponding to the shape of the compartment f. The recesses are surrounded on the peripheral surfaces of the rollers by roughened, corrugated or serrated zones for crimping or corrugating and pressing together the layers 5 and 6 to form the sealed portions c, e and g of the package. As shown, the rollers have circumferential serrated zones 21 at their ends to form the sealed marginal portions c of the package, and transverse zones 22 which form the sealed portions e and g of the package.

Where the material of the layers is heat-sealable the rollers are heated by suitable electric heating devices 23 of known character, for example, as shown in my Patent No. 2,083,617, which heat the packaging material or the thermoplastic coating thereon at the same time pressure is applied to the layers by the serrated surfaces 21 and 22 of the rollers.

The articles h will of course be placed in the compartments f before the sealed portions e of the packages are formed and any suitable article-depositing mechanism may be utilized. In the drawing, a discharge nozzle of such mechanism is designated at C and the articles h may be dropped from this nozzle under control of suitable mechanism into the space between the layers 5 and 6 so that as the rollers rotate in the direction of the arrows shown in Figure 1, the articles will be enclosed between the layers of the material.

It will be observed from the foregoing that it is necessary to maintain proper and uniform contact of the rollers with the layers of packaging material and further to ensure proper meshing or contact of the serrations or corrugations of the rollers with each other. For this purpose I propose to mount a ring member 24 on each end of each of the rollers. This ring is mounted in a cut-away portion of the end surface of the roller and secured to the circumferential serrated portion 21 by pins 25 spaced therearound. The periphery of the ring projects beyond the periphery of the circumferential serrated portion 21 and the peripheries of the adjacent rings are adapted to contact each other as seen in Figure 2 leaving a space between the adjacent serrated zones as indicated at 26. This space is sufficient to receive the packaging material between the zones of contact of the rollers and sufficient to permit the peripheral surfaces of the rollers to accurately contact with each other throughout their lengths and with uniform and proper pressure along the zone of contact of the rollers with the layers of packaging material so that the layers will be accurately and uniformly sealed together and crimped. By reason of this construction, there is no possibility of the projections penetrating too deep into the layers and on the other hand no possibility of the projections not penetrating deep enough.

In the form of my invention shown in Figure 3, a ring member 27 is positioned adjacent each end of the roller 9a with its hub portion 28 fixed on shaft 11a. The ring member is provided with a tapered or conical surface. On shaft 10a, a ring member 29 similar to ring 27 is screw threaded on a threaded portion 30 of said shaft at each end of the roller 8a. The ring 29 is provided with a tapered or conical surface of the same pitch as the tapered surface of ring 27 for coaction therewith. A slight clearance 31 is provided between the surface of ring 29 and the end surface of roller 8a when the ring is moved to its innermost position to permit the ring to ride on the tapered surface of the ring 27 to thereby move the roller 8a toward and away from the roller 9a to adjust the space between the serrated zones of the rollers. A binding screw 32 extending through the hub portion 33 of ring 29 and engaging shaft 10a serves to hold the ring in adjusted position along the shaft. By loosening the binding screw and moving the ring along the shaft, the degree of separation of the serrated zone of the rollers may be variably effected to a nicety. By reason of this construction, a very fine adjustment of the clearance between the rollers is provided and the rollers are kept in proper relation to each other throughout their operation. The arrangement is very simple and readily adjustable to compensate for change in the thickness of the packaging material.

Changes in details might be resorted to without departing from the spirit and scope of the invention and I desire to be limited only by the state of the prior art and the appended claims.

I claim:

1. In a packaging apparatus, a pair of sealing and crimping rollers for receiving layers of packaging material between their peripheries, the surface of each roller having a circumferential peripheral serrated portion at each end thereof and a transverse peripheral serrated portion formed to engage and press one of said layers of packaging material into contact with the other layer, mechanism mounting said rollers for rotation about parallel axes, means for yieldingly pressing one of said rollers toward the other and annular contacting members associated with said rollers for maintaining the serrated portions in proper spaced relationship.

2. In a packaging apparatus, a pair of sealing and crimping rollers for receiving layers of packaging material between their peripheries, the surface of each roller having a circumferential peripheral serrated portion at each end thereof and a transverse peripheral serrated portion formed to engage and press one of said layers of packaging material into contact with the other layer, mechanism mounting said rollers for rotation about parallel axes, means for yieldingly pressing one of said rollers toward the other and ring members fixed on the circumferential peripheral serrated portions for maintaining the serrated portions in proper spaced relationship.

3. In a packaging apparatus, a pair of sealing and crimping rollers for receiving layers of packaging material between their peripheries, the surface of each roller having a circumferential peripheral serrated portion at each end thereof and a transverse peripheral serrated portion formed to engage and press one of said layers of packaging material into contact with the other layer, mechanism mounting said rollers for rotation about approximately parallel axes including parallel shafts, means for yieldingly pressing one of said rollers toward the other, a ring member fixed on one of said shafts adjacent one end of one of said rollers, said ring member having a tapered surface and a ring member adjustably connected to the other shaft at the adjacent end of the other roller, said latter ring member having a tapered surface for coacting with the tapered surface of the first-named ring member whereby the spacing between the serrated portions of the rollers may be adjusted and maintained in proper relationship.

4. In a packaging apparatus, a pair of sealing and crimping rollers for receiving layers of packaging material between their peripheries, the surface of each roller having a circumferential peripheral serrated portion at each end thereof and a transverse peripheral serrated portion formed to engage and press one of said layers of packaging material into contact with the other layer, mechanism mounting said rollers for rotation about approximately parallel axes including parallel shafts, means for yieldingly pressing one of said rollers toward the other and a ring member fixed on one of said shafts adjacent one end of one of said rollers, said ring member having a tapered surface, and a ring member adjustably connected to the other shaft at the adjacent end of the other roller, said latter ring member having a tapered surface for coacting with the tapered surface of the first-named ring member whereby the spacing between the serrated portions of the rollers may be adjusted and maintained in proper relationship and means for holding said latter ring member in adjusted position.

5. In a packaging apparatus, a pair of sealing and crimping rollers for receiving layers of packaging material between their peripheries, peripheral portions of each roller being formed to engage and press one of said layers of packaging material into contact with the other layer and each roller having serrations to intermesh with the serrations on the other roller, mechanism mounting said rollers for rotation about parallel axes, means for yieldingly pressing one of said rollers toward the other and annular contacting members on each roller to contact with similar members on the other roller for maintaining the peripheries of said rollers in proper spaced relationship.

6. In packaging apparatus, a pair of sealing rollers rotatably mounted about approximately parallel axes to receive and press layers of packaging material between them for sealing said layers together, means yieldingly pressing one of said rollers toward the other, there being an annular surface at each end of each roller and coaxial therewith to contact with a similar surface on the other roller, said surfaces of at least one roller being of a diameter greater than that of the corresponding roller whereby said surfaces hold the peripheries of said rollers in spaced relation to each other.

LEROY L. SALFISBERG.